United States Patent
Mori et al.

(10) Patent No.: US 8,900,079 B2
(45) Date of Patent: Dec. 2, 2014

(54) TRANSMISSION GUIDE

(71) Applicant: Tsubakimoto Chain Co., Osaka (JP)

(72) Inventors: Kaori Mori, Osaka (JP); Masahiko Konno, Osaka (JP); Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 60 days.

(21) Appl. No.: 13/632,453

(22) Filed: Oct. 1, 2012

(65) Prior Publication Data

US 2013/0090201 A1   Apr. 11, 2013

(30) Foreign Application Priority Data

Oct. 7, 2011   (JP) .................. 2011-222884

(51) Int. Cl.
*F16H 7/18*   (2006.01)
*F16H 7/08*   (2006.01)

(52) U.S. Cl.
USPC .......................................... 474/140; 474/111

(58) Field of Classification Search
CPC ............... F16H 2007/0872; F16H 2007/0806; F16H 2007/0804; F16H 7/08; F16H 7/18; F16H 2007/185
USPC ................................ 474/140, 111
See application file for complete search history.

(56) References Cited

U.S. PATENT DOCUMENTS

| | | | | |
|---|---|---|---|---|
| 144,144 A | * | 10/1873 | Rodgers | 474/140 |
| 2,963,918 A | * | 12/1960 | Blakstad | 474/111 |
| 3,139,655 A | * | 7/1964 | Cooper et al. | 164/254 |
| 4,832,664 A | * | 5/1989 | Groger et al. | 474/111 |
| 5,628,701 A | * | 5/1997 | Dembosky et al. | 474/103 |
| 5,647,811 A | * | 7/1997 | Mott | 474/91 |
| 5,813,935 A | * | 9/1998 | Dembosky et al. | 474/111 |
| 6,036,613 A | * | 3/2000 | Diehm | 474/111 |
| 6,412,464 B1 | * | 7/2002 | Schneider et al. | 123/90.31 |
| 6,554,728 B2 | * | 4/2003 | Young et al. | 474/140 |
| 6,939,259 B2 | * | 9/2005 | Thomas et al. | 474/111 |
| 7,537,044 B2 | * | 5/2009 | Kurematsu et al. | 164/137 |
| 7,942,769 B2 | * | 5/2011 | Pflug et al. | 474/91 |
| 2002/0042316 A1 | * | 4/2002 | Young et al. | 474/140 |
| 2002/0050184 A1 | * | 5/2002 | Suzuki | 74/523 |
| 2002/0069539 A1 | * | 6/2002 | Tada | 30/383 |
| 2002/0193192 A1 | * | 12/2002 | Inoue et al. | 474/111 |
| 2004/0159296 A1 | * | 8/2004 | Fink et al. | 123/90.31 |
| 2005/0079938 A1 | | 4/2005 | Hashimoto | |
| 2005/0085322 A1 | * | 4/2005 | Markley | 474/109 |
| 2007/0029696 A1 | * | 2/2007 | Kurematsu et al. | 264/172.19 |

(Continued)

FOREIGN PATENT DOCUMENTS

JP   2004150615   5/2004
JP   2005114126   4/2005

*Primary Examiner* — Henry Liu
(74) *Attorney, Agent, or Firm* — Howson & Howson LLP (57) ABSTRACT

A transmission guide comprises a synthetic resin shoe supported by and integrally molded with a synthetic resin base by two-part molding. A guide length retaining mechanism, which can be formed by one or more protrusions on the back of the shoe and one or more cooperating recesses on the supporting surface of the base, retains the shoe against longitudinal movement relative to the base. A guide width retaining mechanism, which can be formed by projections on the edges of the shoe and cooperating holes formed in side walls extending from the supporting surface of the base, retains the shoe against widthwise movement relative to the base.

16 Claims, 12 Drawing Sheets

(56) References Cited

U.S. PATENT DOCUMENTS

| | | | |
|---|---|---|---|
| 2009/0105023 A1* | 4/2009 | Oota et al. | 474/111 |
| 2009/0325748 A1* | 12/2009 | Pflug et al. | 474/91 |
| 2010/0113198 A1* | 5/2010 | Ullein et al. | 474/110 |
| 2012/0129636 A1* | 5/2012 | Lee et al. | 474/111 |

\* cited by examiner

GUIDE LONGITUDINAL DIRECTION

GUIDE WIDTH DIRECTION

TRANSMISSION GUIDE

CROSS REFERENCE TO RELATED APPLICATION

This application claims priority on the basis of Japanese Patent Application 2011-222884, filed on Oct. 7, 2011. The disclosure of Japanese Patent Application No. 2011-222884 is herein incorporated by reference.

FIELD OF THE INVENTION

This invention relates to a transmission guide for use as a stationary guide for guiding a traveling transmission chain, or as a movable guide for applying tension to, and guiding, the chain. A transmission incorporating the guide described herein can be used in an automobile engine, for example, to transmit power by means of an endless roller chain or a silent chain engaged with a driving sprocket and one or more driven sprockets.

BACKGROUND OF THE INVENTION

Figure 19:
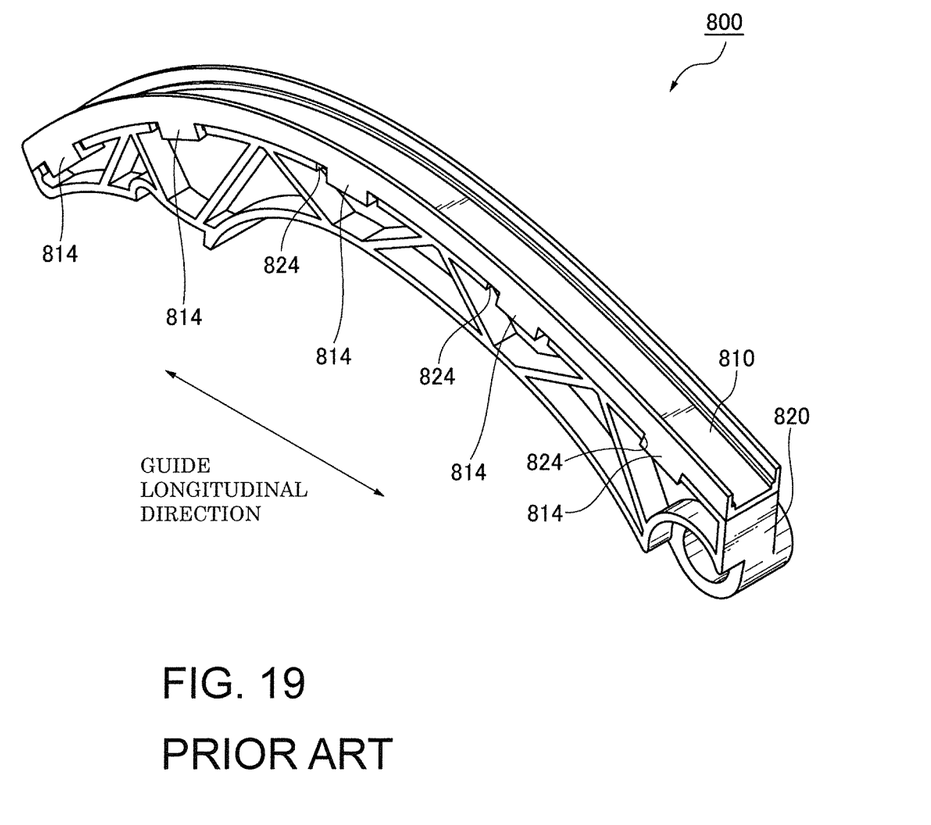
FIG. 19 is a perspective view of a prior art transmission guide.
Figure 20:
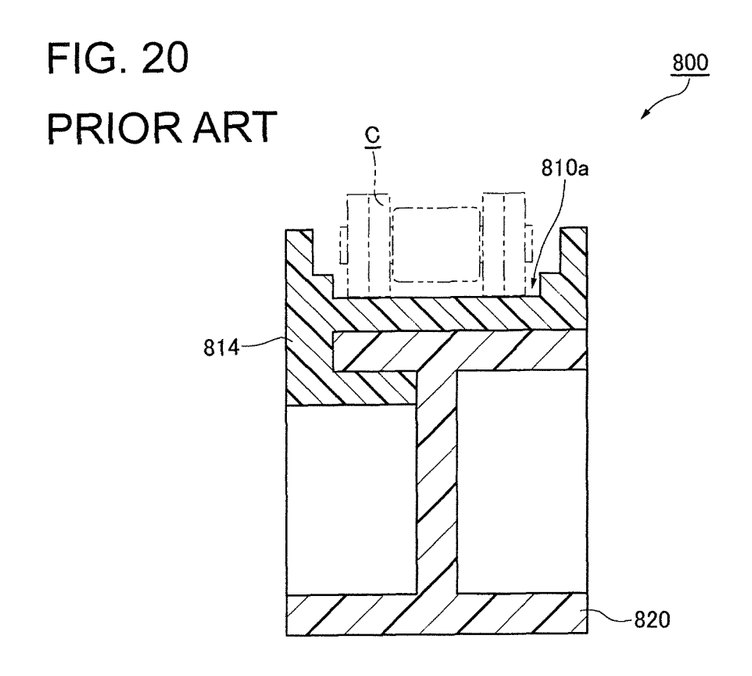
FIG. 20 is a transverse cross sectional view of the transmission guide shown in FIG. 19.

FIGS. 19 and 20 show a conventional transmission guide 800 for use in the timing transmission of an automobile engine. The guide 800 comprises a shoe 810 on which a transmission chain C slides, and a base 820 separately molded and integrally assembled with the shoe 810 to support and maintain the configuration of the shoe. This transmission guide is disclosed in United States Patent Application publication No. 2005/0079938, published Apr. 14, 2005.

Another known chain guide, disclosed in Japanese laid-open Patent Application No. 2004-150615, dated May 27, 2004, comprises a base composed of primary synthetic resin and a shoe composed of secondary synthetic resin on which a transmission chain slides. The shoe has a back surface that is fused integrally with a supporting surface of the base after molding the base.

In the prior art transmission guide 800, vibration due to load variations causes the shoe 810 to move longitudinally through a distance corresponding to a margin allowed for assembly when the transmission chain slides on the surface 810a of the shoe. Therefore, each hook 814 of the shoe 810 locally abuts an end of a notch 824 in the base 820, causing an excessive concentration of stress in the hooks. The excessive stress can result in breakage of a hook, separation of the shoe from the base, and failure of the guide to maintain proper travel of the transmission chain.

In a chain guide in which the back of a synthetic resin shoe is fused to the base, it is difficult to maintain the bond between the shoe and the base over a long time because, when transmission chain is located eccentrically in the direction of the width of the guide, a widthwise shearing force can cause the shoe to separate for the base.

A chain guide is typically operated in a high temperature environment caused by circulation of hot engine oil as well as by sliding friction between the chain and the shoe. The base, which is composed of glass fiber-reinforced resin, and the shoe, which is composed of non-reinforced resin, expand and contract with changes in temperature, and, because the coefficient of thermal expansion of the non-reinforced resin of the shoe is larger than that of the glass fiber-reinforced resin of the base, the different rates of thermal expansion or contraction can also cause the shoe to separate from the base.

There is a need for a transmission guide that can be produced without an assembly step in which a synthetic resin shoe is attached to a synthetic resin base, and in which the strength of the bond between the shoe and the base is enhanced, and which accommodates the differences in the rates of thermal expansion and contraction of the shoe and the base.

SUMMARY OF THE INVENTION

The transmission guide in accordance with the invention comprises an elongated synthetic resin shoe having a sliding contact surface on which link plates of a transmission chain can travel in a longitudinal direction and a back surface, and an elongated synthetic resin base having a supporting surface for supporting the shoe by engagement with the back surface of shoe. The rigidity of the base is greater than the rigidity of the shoe. The shoe is integrally molded with the base by two-member molding whereby the shoe and base are fused together. The guide includes a guide length retaining mechanism, formed on the back surface of the shoe and the supporting surface of the base, for retain the shoe against longitudinal movement relative to the base. The guide also includes a guide width retaining mechanism, formed on side edges of the shoe and side portions of the base, for retaining the shoe against widthwise movement relative to the base.

Two member molding significantly improves the efficiency with which the guide can be manufactured. In addition, the guide is resistant to shearing forces acting on the shoe both in the longitudinal direction and in the widthwise direction, and the strength of the fused bond between the shoe and the base is significantly increased. Moreover the longitudinal direction retaining mechanism limits movement of the shoe relative to the base and absorbs differences in the thermal expansion and contraction of the shoe and the base, thereby preventing the shoe from separating from the supporting surface of the base.

The guide length retaining mechanism can be composed of at least one convex protrusion protruding from the back surface of the shoe and at least one concave recess formed the supporting surface of the base. Each protrusion is disposed in one concave recess. This arrangement provides improved resistance to longitudinal shearing forces acting on the shoe, and also increases the area of the fused bond between the shoe and the base in comparison to a conventional guide in which the surfaces of the shoe and base have straight transverse cross-sections. This guide length retaining mechanism also improves resistance of the guide to failure due to differences in the rates of thermal expansion and contraction of the guide and base when the guide is subjected to large temperature changes in an engine.

If plural convex protrusions are provided on the shoe and plural concave recesses are provided in the base, the protrusions and recesses are disposed at intervals along the length of the guide. Here, the area of the fused bond between the synthetic resin shoe and the synthetic resin base is significantly increased and the strength of the bond is improved.

In accordance with an aspect of the invention, each convex protrusion on the shoe and each concave recess of the base can have a gradually reducing width, proceeding in a direction from a chain entry end toward a chain exit end of the guide. The shapes of the protrusions and recesses suppress shearing forces acting on the shoe in the direction of chain travel and improve the strength of the bond between the shoe and the base.

The guide width retaining mechanism can be composed of a pair of opposed side walls that extend from the supporting surface of the base on opposite side edges of the shoe, and projections extending from side edges of the shoe. The side walls sandwich the shoe from both sides in the guide width direction, and the side walls are formed with holes that receive the projections. Here, the resistance of the guide to widthwise shearing forces acting on the shoe is significantly improved in comparison to the resistance to widthwise shearing forces of a conventional guide in which base has a straight supporting surface. Sandwiching of the synthetic from both sides also significant increases the area of the fused bond between the shoe and the base.

In accordance with another aspect of the invention, a plurality of concave recesses are formed in the sliding contact surface of the shoe and disposed along a longitudinal center line between the side edges of the shoe. Lubricating oil, present in an engine in the form of a mist, condenses in these recesses and remains there even when the engine is stopped. Therefore, on restarting of the engine, lubrication of the sliding contact surface of the guide is rapidly restored.

In the case in which the shoe is formed with projections extending from its side edges, each of the concave recesses in the sliding contact surface of the shoe can be juxtaposed with a pair of projections extending from the side edges of the shoe.

When the shoe thermally expands, the expansion of the convex protrusions on the back of the shoe is suppressed by the concave recesses of the base, and the thermal expansion of the engagement lateral projections of the shoe is suppressed by their engagement with holes in the side walls. In addition, the juxtaposition of the lateral projections with the recesses in the sliding contact surface of the shoe prevents strain of the sliding-contact surface in the guide width direction caused by the thermal expansion and contraction of the shoe ensures stable chain travel.

In accordance with another aspect of the invention, the convex protrusion of the shoe can be in the form of a strip extending longitudinally along the shoe, and the concave recess of the base can be in the form of an groove extending longitudinally along the base. The use of a longitudinal strip in cooperation with a longitudinal groove significantly increases the area and strength of the fused bond between the synthetic resin shoe and the synthetic resin base.

The convex protrusion of the shoe and the concave recess of the base can have a wave-like shape characterized by an alternating widthwise deviation from one side to the other of a longitudinal center line extending along the length of the guide.

The wavy shape of the protrusion and recess suppresses shearing forces acting on the shoe in the longitudinal direction and enhances the strength of the bond between the shoe and the guide.

The convex protrusion of the shoe and the concave recess of the base can include a plurality of parts each having a width that gradually decreases proceeding from the chain entry end of the guide toward the chain exit end. Here, as in the embodiment in which the protrusion and groove have a wave-like shape, longitudinal shearing forces acting on the shoe are suppressed and the strength of the bond between the shoe and the base is increased.

In accordance with still another aspect of the invention, a concave recess formed in the sliding contact surface of the shoe can be in the form of an elongated longitudinal groove extending along a center line between opposite side edges of the shoe. The elongated longitudinal groove efficiently radiates heat generated by sliding travel of the transmission chain on the sliding contact surface of the shoe, and prevents excessive increase of the temperature of the shoe, and resulting softening and deformation of the shoe that would otherwise occur in a high temperature environment.

In the case in which the shoe is formed with a plurality of concave recesses in its sliding contact surface disposed along a longitudinal center line between side edges, of each of concave recesses can have a wedge-shaped cross-section tapering in the direction of the width of the guide, proceeding into the shoe from the sliding contact surface thereof in a direction orthogonal to the sliding-contact surface. The tapered wedge shape of the recesses allows lubricating oil to flow readily from the recesses onto the area of sliding contact surface on which the chain slides.

In still another aspect of the invention, the sliding-contact surface of the shoe can be formed with a central part having a slope on both sides of a longitudinal center line, whereby the central part of the sliding contact surface is disposed inward from the outer parts thereof.

In this embodiment, parts of the link plates of the transmission chain closer to the center of the chain can travel without contacting, or while only partly contacting, the sliding-contact surface. Therefore, it is possible to reduce frictional loss that would otherwise occur as a result of friction between the transmission chain and the sliding-contact surface, and to suppress wear and damage to the sliding-contact surface.

PREFERRED EMBODIMENT OF THE INVENTION

Figure 1:
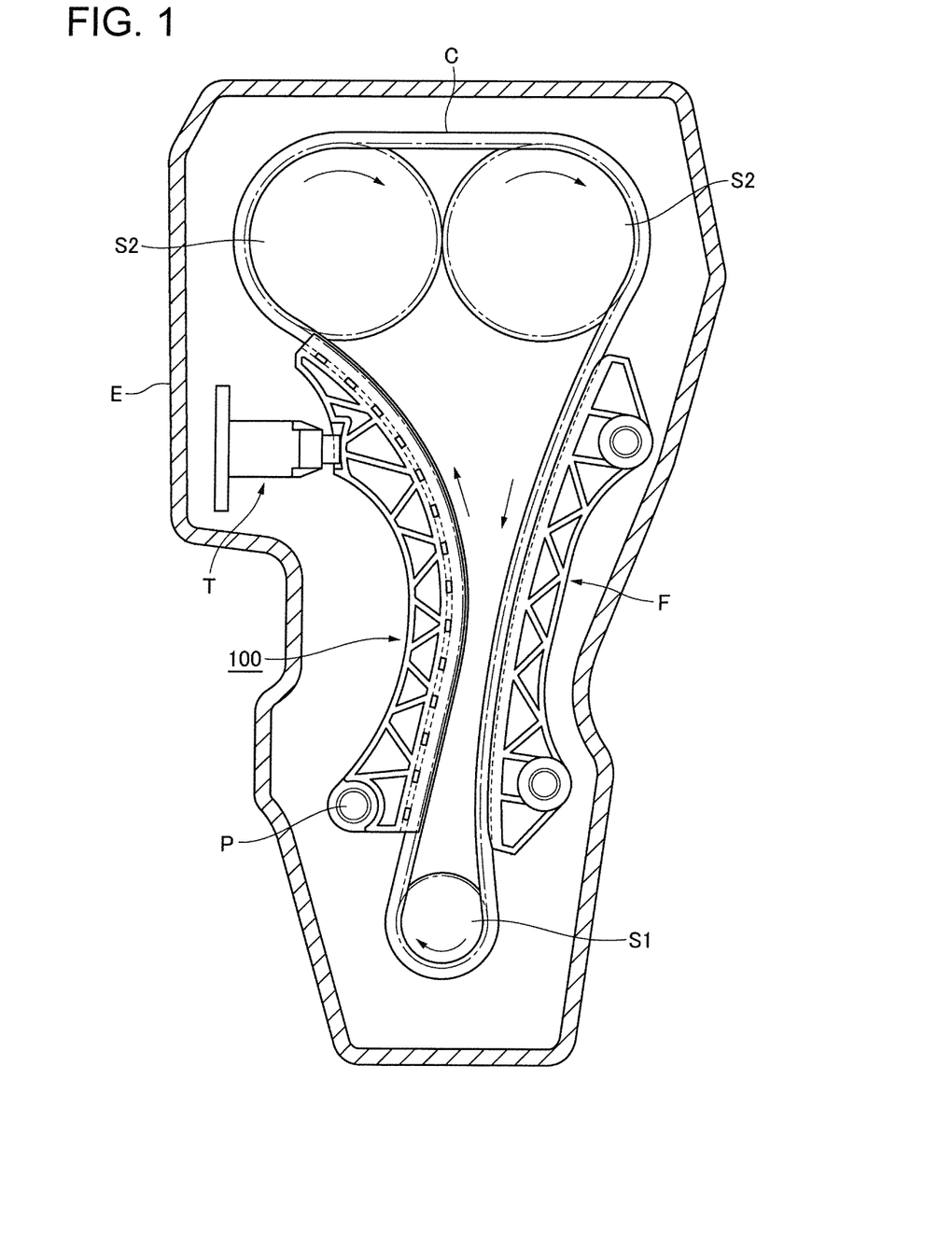
FIG. 1 is a schematic front elevational view of the timing drive of a DOHC (dual overhead cam) internal combustion engine, incorporating a transmission guide according to the invention.

As shown in FIG. 1, the transmission guide 100 of the first embodiment comprises a crankshaft sprocket S1, camshaft sprockets S2, and a transmission chain C in mesh with the sprockets and arranged to transmit power from the crankshaft of the engine to the camshafts. A movable transmission guide 100 is pivoted on a shoulder bolt P attached to the block of engine E and is in sliding contact with a span of the chain C that travels from the crankshaft sprocket to one of the camshaft sprockets.

To prevent malfunction of the chain transmission caused by excessive tension or excessive looseness of the chain, a tensioner T applies tension to the chain by acting on the chain through the movable transmission guide 100. A stationary guide F attached to the engine block is in sliding contact with the span of the chain that travels from the other camshaft sprocket S2 to the crankshaft sprocket S1.

Figure 2:
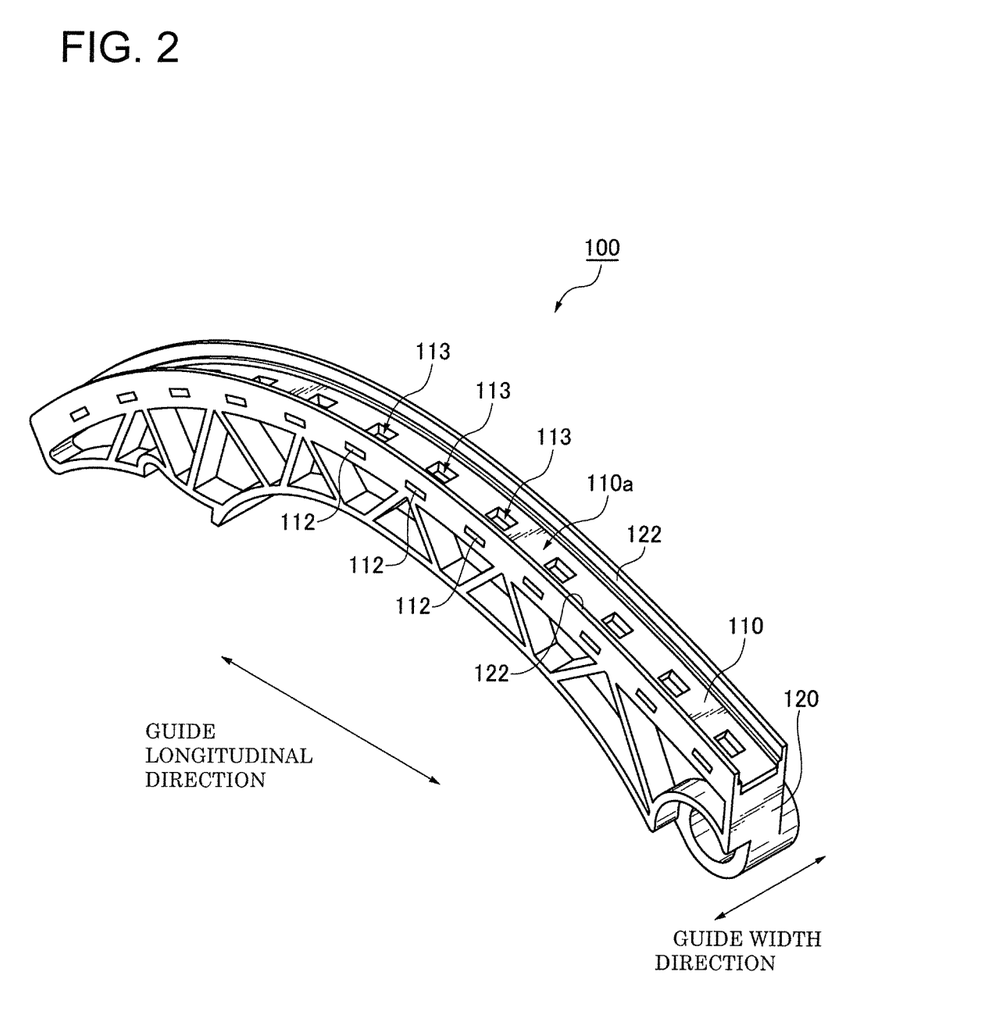
FIG. 2 is a perspective view of the transmission guide shown in FIG. 1.
Figure 3:
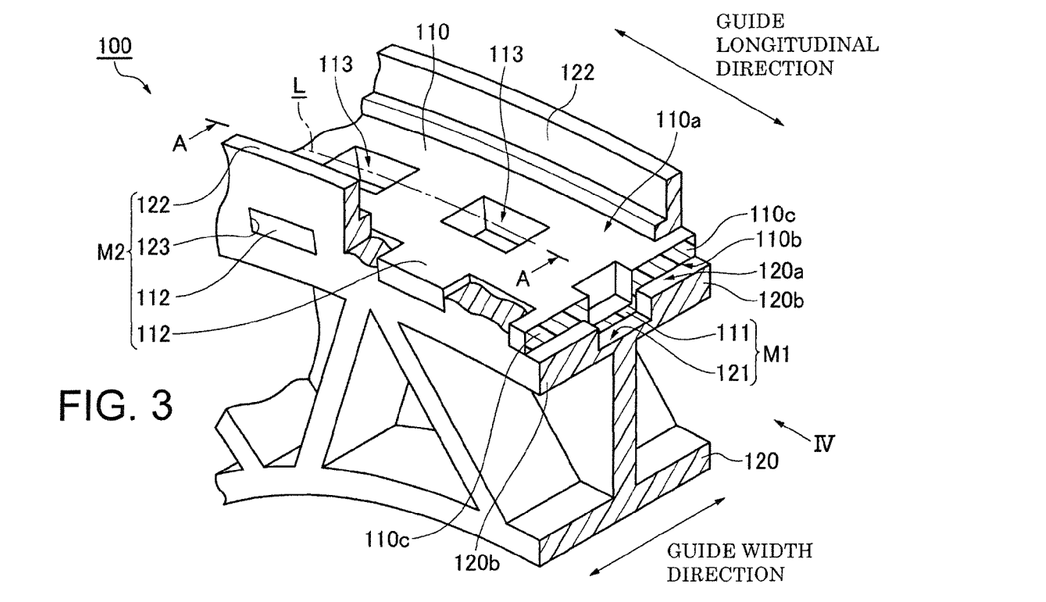
FIG. 3 is a fragmentary perspective view of the transmission guide of FIG. 2, partly in section.
Figure 4:
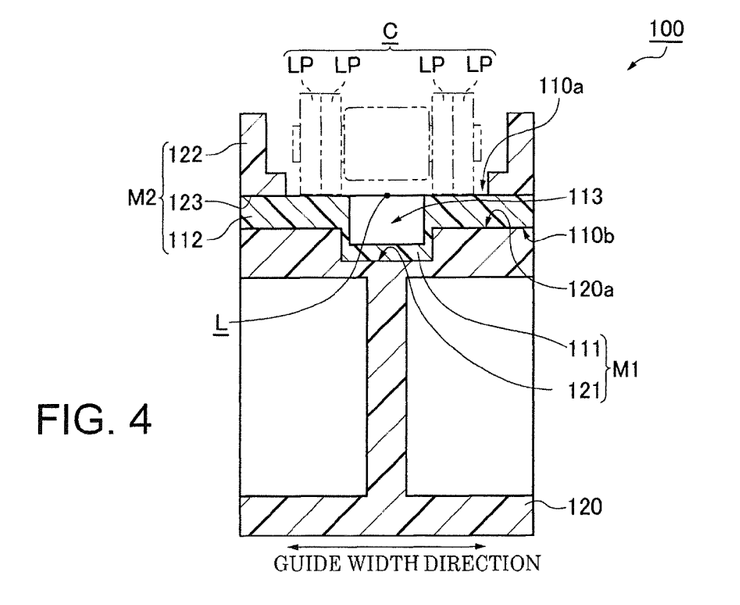
FIG. 4 is a sectional view of the transmission guide of FIGS. 2 and 3, seen in a direction of arrow IV in FIG. 3.

In the embodiment shown in FIGS. 2-4, the shoe 110 has an elongated sliding contact surface 110a on which the transmission chain travels longitudinally. The base 120 is composed of reinforced polyamide resin containing glass fibers, and has a rigidity higher than that of the shoe. As shown in FIG. 4, a supporting surface 120a on the base supports a back surface 110b of the shoe 110 along the length of the guide.

The movable guide is fabricated by a "two-member molding," a process in which the shoe 110, which is composed of polyamide resin, is integrated with a synthetic resin base 120. In the two member molding process, the synthetic resin shoe 110 is formed by secondary injection molding, using a die, after molding of the base 120 in a primary injection molding step.

As shown in FIGS. 3 and 4, the movable guide includes a guide length retaining mechanism M1, composed of cooperating elements on the back of the shoe and the front of the guide, for retaining the shoe 110 against lengthwise movement relative to the base. The guide also includes a guide width retaining mechanism M2, composed of cooperating elements on the edges 110c of the shoe and on the edges 120b of the base, to retain the shoe against widthwise movement relative to the base.

A shearing force applied to shoe 110 along the longitudinal direction of the guide, is resisted by the guide length retaining mechanism M1, and a shearing force applied to shoe 110 in the widthwise direction of the guide is resisted by the guide width retaining mechanism M2. The guide length retaining mechanism M1 also limits relative movement of the shoe 110 and the base 120 while absorbing differences in thermal expansion and contraction between the shoe and the base.

As shown in FIG. 4, the guide length retaining mechanism M1 is composed of convex protrusions 111 protruding from the back surface 110b of the shoe 110 and concave recesses 121 formed in the supporting surface 120a of the base 120. The protrusions are received in the recesses, limiting longitudinal movement of the shoe relative to the base. The cooperation of the protrusions and recesses not only resists longitudinal shearing forces but also increases the area over which the shoe and base are fused together.

The coefficient of thermal expansion of the shoe 110 is larger than the coefficient of thermal expansion of the base 120. However, the cooperating protrusions and recesses allow expansion and contraction of the shoe while the shoe is connected to the base, even under the severe conditions of thermal expansion and contraction that result temperature changes within an engine.

Figure 5:
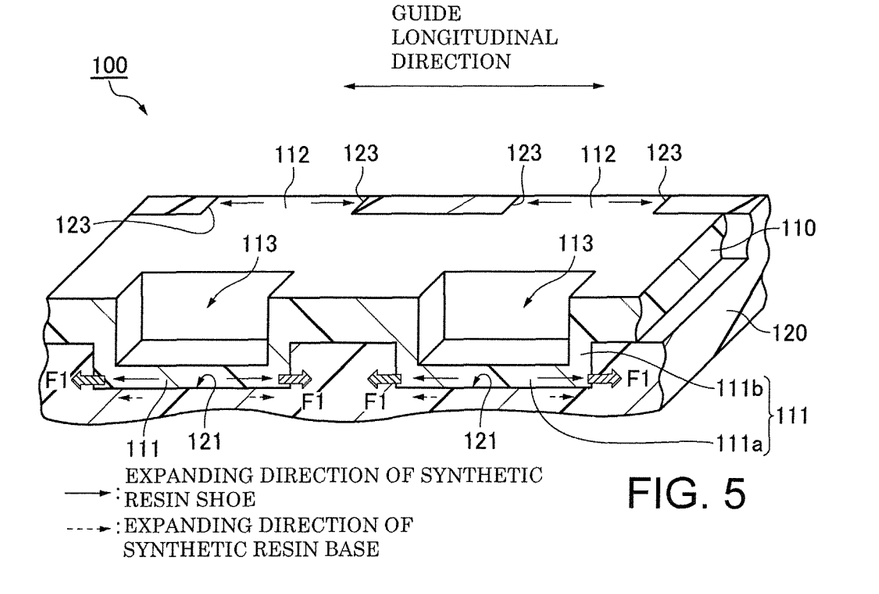
FIG. 5 is a perspective view, partly in a section taken on section plane A-A in FIG. 3, showing the thermal behavior of the transmission guide when the temperature rises.

As shown in FIG. 5, when the temperature of the transmission guide 100 rises, the portions of the shoe between adjacent protrusions 111 tend to expand longitudinally, but the protrusions 111 expand to a still greater degree within the recess 121. Therefore, the protrusions 111 press the engaged concave recesses 121 in the longitudinal direction near the end portions 111a of the protrusions 111, in directions indicated by arrows F1.

Figure 6:
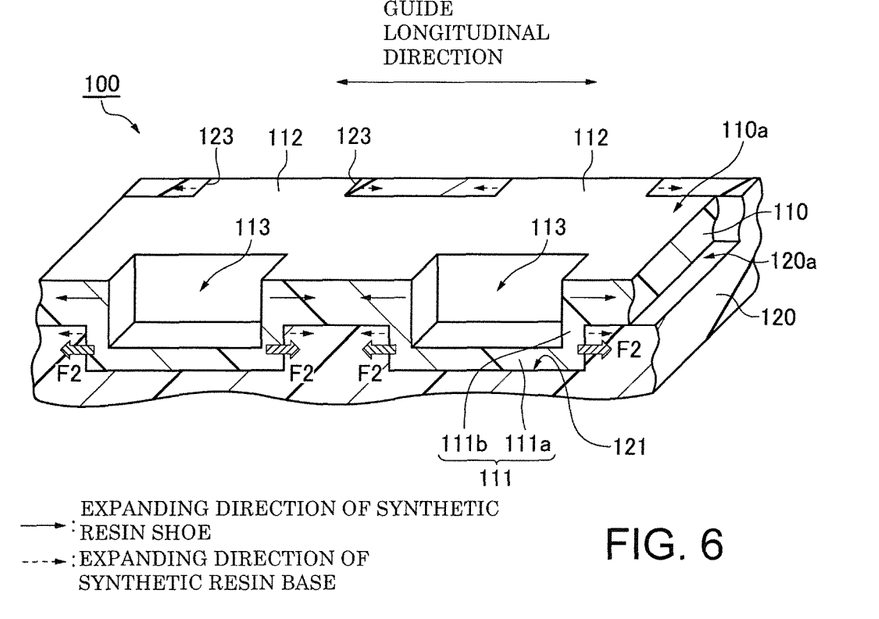
FIG. 6 is a perspective view, partly in a section taken on section plane A-A in FIG. 3, showing the thermal behavior of the transmission guide when the temperature drops.

As shown in FIG. 6, when the temperature of the transmission guide 100 drops, the parts of the shoe 110 between adjacent protrusions tend to contract longitudinally, while the protrusions 111 contract to a still greater degree. As a result, portions 111b of the protrusions 111, which are spaced from the bottoms of the recesses 121, press longitudinally against the recesses 121 in directions indicated by arrows F2.

As shown in FIG. 3, the convex protrusions 111 of the shoe 110 and the concave recesses 121 of the base 120 are formed at corresponding intervals along the longitudinal direction of the guide so that each protrusion fits into a corresponding recess. The area over which the shoe 110 is fused to the base 120 is increased as a result of the cooperating relationship between the protrusions and the recesses, and the bond between the shoe and the base is thereby strengthened.

The guide width retaining mechanism M2 is composed of a pair of spaced, opposed, side walls 122 of the base that extend from the opposite edges of the supporting surface 120a of the base 120 toward the side thereof on which a transmission chain will be situated when the guide is in use. These walls sandwich the shoe 110 from both sides. Projections 112, formed on both sides of the shoe, project widthwise into holes 123 in the side walls 122. The side walls 122 of the base resist widthwise shearing forces applied to the shoe 110. In addition, the sandwiched relationship between the shoe and the side walls of the base still further increases the area over which the shoe is fused to the base.

Compared to a transmission guide in which a flat or smoothly curved back surface of a synthetic resin shoe is fused to a flat or correspondingly curved supporting surface of a synthetic resin base, the guide according to the invention has a significantly stronger bond between the shoe and the base.

As shown in FIG. 4, the shoe 110 is formed with concave recesses 113 in its sliding-contact surface 110a. These recesses are formed inside the protrusions 111, and extend in a series along a center line L midway between the side walls of the guide so that the link plates LP of a transmission chain C can slide on continuous portions of the sliding contact surface 110a on both sides of the series of recesses.

Lubricating oil, which forms a mist within the timing chain compartment of an engine, condenses in recesses 113, and some of the oil remains within these recesses even when the engine is stopped. On restarting the engine, when a conventional chain guide and the chain typically lack adequate lubricant, movement of the guide causes oil within the recesses 113 of the shoe to flow quickly to the areas of sliding contact surface on which the chain travels, thereby improving transmission efficiency when the engine is restarted.

As shown in FIGS. 3 and 4, the concave recesses 113 of the shoe 110 are juxtaposed with the projections 112 on the sides of the shoe. As shown in FIG. 5, thermal expansion of protrusions 111 on the back of the shoe is suppressed by the engaged concave recesses 121, and thermal expansion of the projections 112 is suppressed by engagement with the ends of holes 123. As shown in FIG. 6, on thermal contraction, the recesses 113 contract in the longitudinal direction of the guide, and the projections 112 also contract. The juxtaposition of the recesses 113 and the projections 112 prevents strain of the sliding-contact surface 110a, which would occur if the recesses and projections were disposed in alternating along the direction of the length of the guide. Prevention of strain ensures stable travel of the transmission chain.

The guide length retaining mechanism M1 and the guide width direction retaining mechanism M2 enhance and maintain the strength of the fused bond between the shoe 110 and the base 120 in the widthwise direction as well as in the lengthwise direction, absorb relative movements of the shoe and base that result from differences in their coefficients of thermal expansion, and help to prevent the separation of the shoe from the supporting surface 120a of the base.

Figure 7:
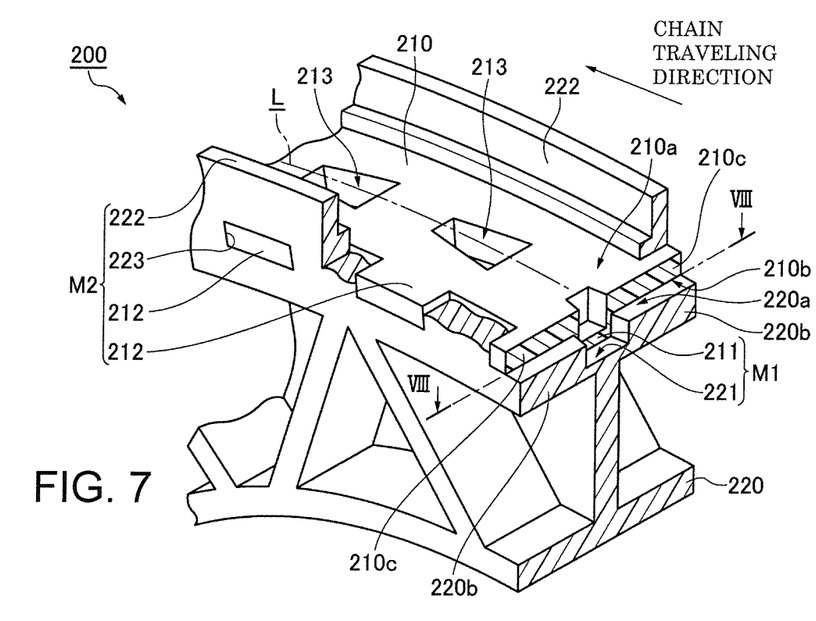
FIG. 7 is a fragmentary perspective view of a transmission guide according to a second embodiment of the invention.
Figure 8:
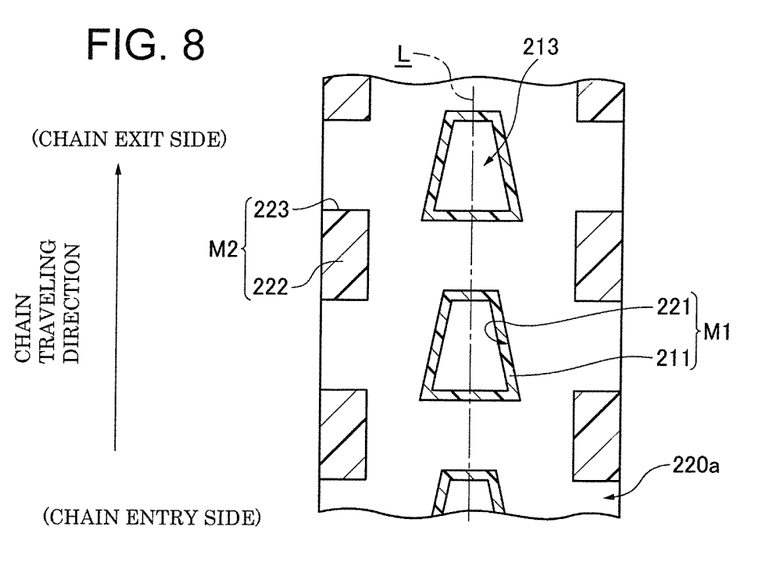
FIG. 8 is a sectional view of the transmission guide taken through the synthetic resin shoe and seen in the direction of arrows VIII-VIII in FIG. 7.

In FIGS. 7 and 8, which show a second embodiment of the guide according to the invention, reference numbers exceed by one hundred the reference numbers of corresponding parts in FIG. 3.

Protrusions 211 of a synthetic resin shoe 210, and recesses 221 of a synthetic resin base 220, are formed such that their widths gradually decrease, proceeding in the direction of chain travel. i.e., from the chain entry end to the chain exit end of the guide. Each of the protrusions and recesses has a substantially isosceles trapezoidal shape in cross-section, respectively, when seen in a direction perpendicular to the sliding contact surface of the guide as in FIG. 8. The trapezoidal shape of the recesses 221 suppresses shearing forces applied to shoe 210 in the direction of chain travel. The movable guide 200 of the second embodiment of course also exhibits the above-described effects and advantages of the guide 100 of the first embodiment.

Figure 9:
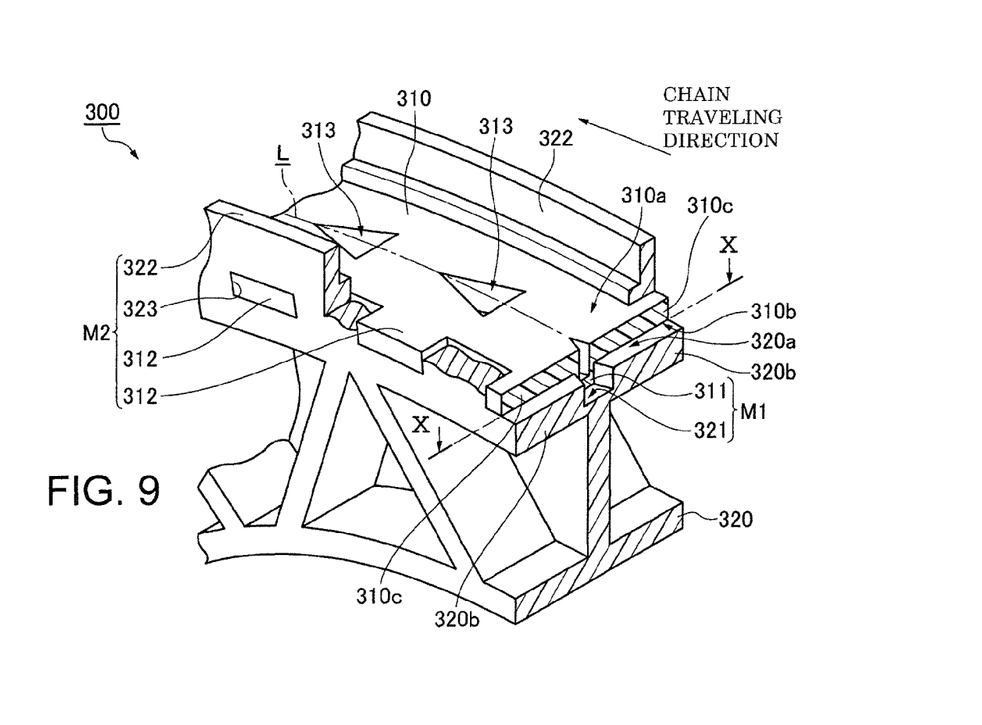
FIG. 9 is a fragmentary perspective view of a transmission guide according to a third embodiment of the invention.
Figure 10:
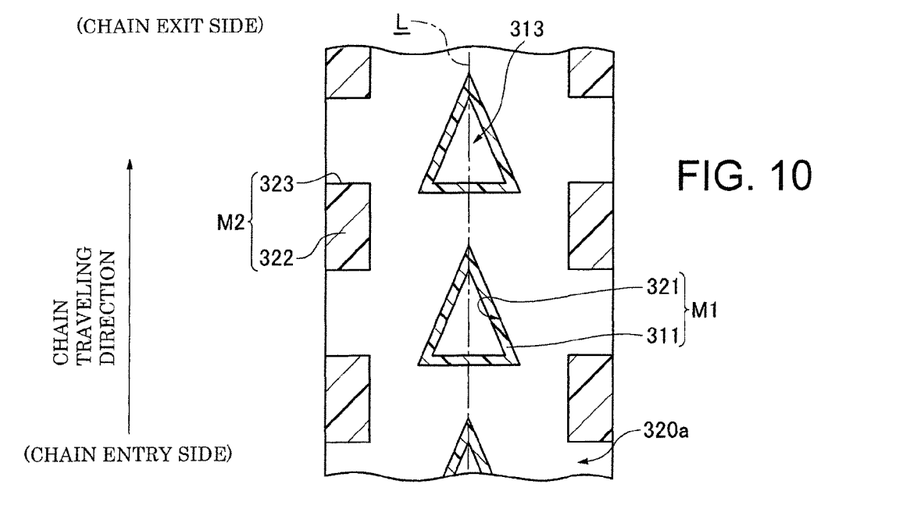
FIG. 10 is a sectional view of the transmission guide taken through the synthetic resin shoe and seen in the direction of arrows X-X in FIG. 9.

In FIGS. 9 and 10, which show a third embodiment of the guide according to the invention, reference numbers exceed by two hundred the reference numbers of corresponding parts in FIG. 3. Protrusions 311 of a synthetic resin shoe 310, and recesses 321 in a synthetic resin base 320, are formed so that their widths decrease gradually proceeding in the direction of chain travel. Each of the protrusions and recesses has a substantially isosceles triangular shape in cross-section, respectively, when seen in a direction perpendicular to the sliding contact surface of the guide as in FIG. 10. As in the case of the second embodiment in which the protrusions and recesses are trapezoidal, in the third embodiment, the triangular shape of the recesses 321 suppresses shearing forces applied to shoe 310 in the direction of chain travel. The movable guide 300 of the third embodiment also exhibits the effects and advantages of the guide 100 of the first embodiment.

Figure 11:
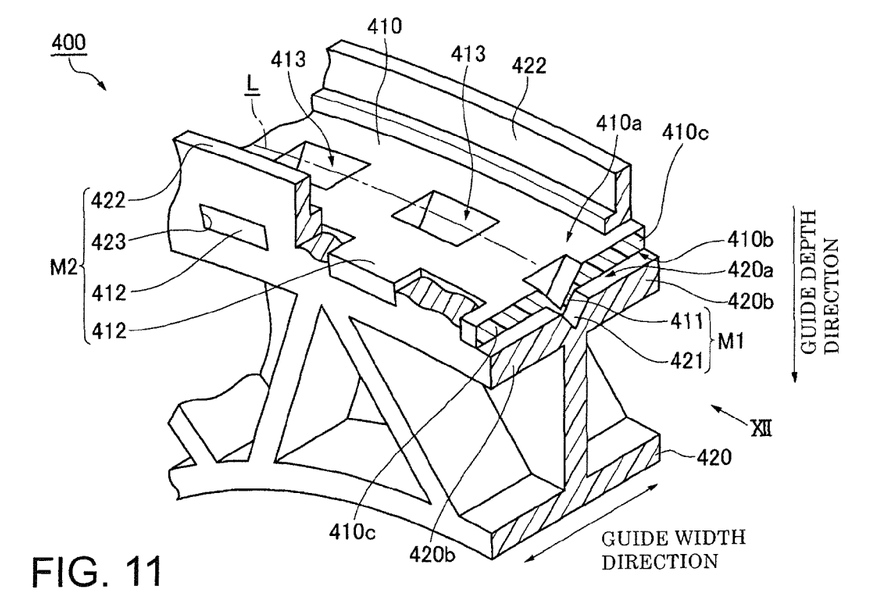
FIG. 11 is a fragmentary perspective view of a transmission guide according to a fourth embodiment of the invention.
Figure 12:
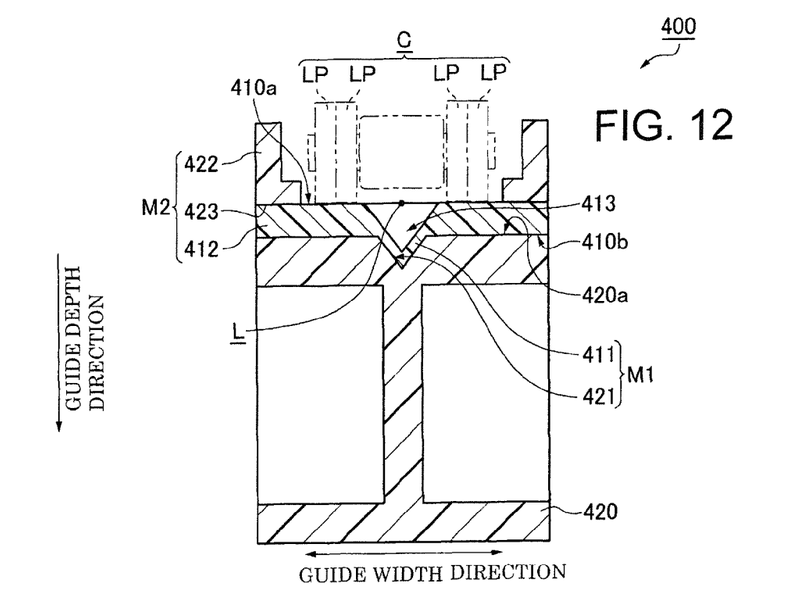
FIG. 12 is a sectional view of the transmission guide taken through the synthetic resin shoe and seen in the direction of arrow XII in FIG. 11.

In FIGS. 11 and 12, which show a fourth embodiment of the guide according to the invention, reference numbers exceed by three hundred the reference numbers of corresponding parts in FIG. 3.

Concave recesses 413 in a synthetic resin shoe 410 have a wedge-like shape, tapering in the direction of the width of the guide, proceeding into the shoe from the sliding contact surface 410a in a direction orthogonal to the sliding-contact surface. The narrow edge at the deepest part of each recess extends in the direction of the length of the guide. The wedge-like shape of the recesses 413 enables oil, which accumulates in the recesses, to flow more readily onto the sliding contact surface 410 of the shoe to lubricate a chain traveling thereon.

Again, the movable guide 400 of the fourth embodiment also exhibits the effects and advantages of the guide 100 of the first embodiment.

Figure 13:
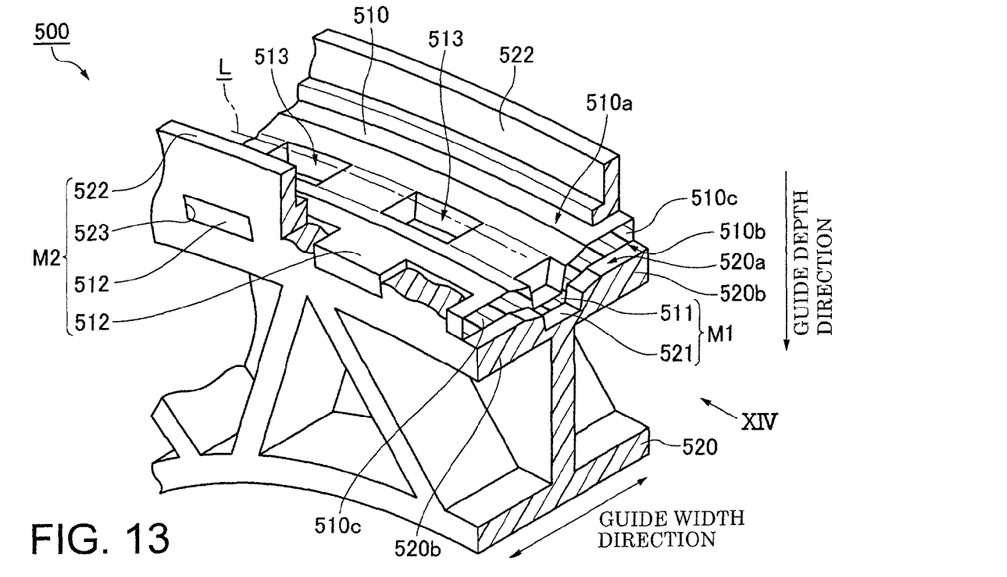
FIG. 13 is a fragmentary perspective view of a transmission guide according to a fifth embodiment of the invention.
Figure 14:
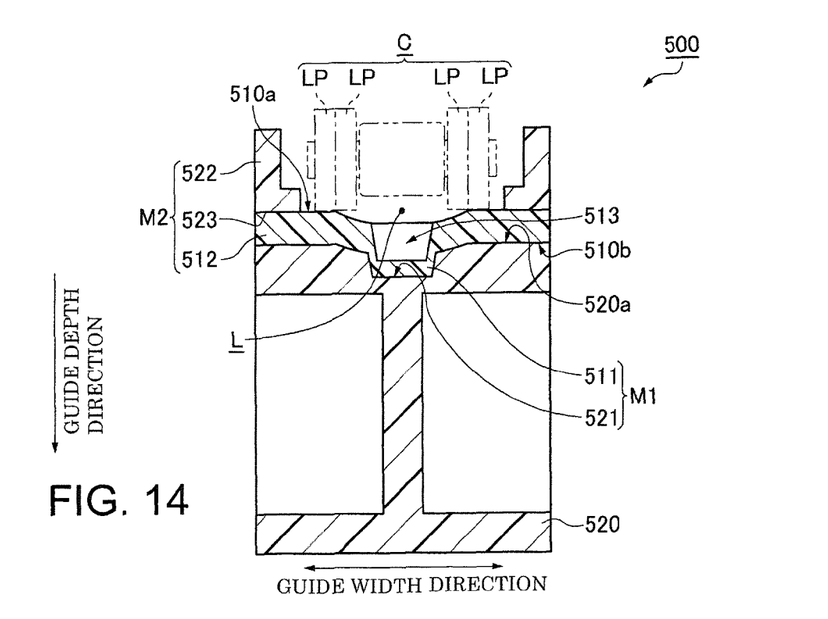
FIG. 14 is a sectional view of the transmission guide taken seen in the direction of arrow XIV in FIG. 13.

In FIGS. 13 and 14, which show a fifth embodiment of the guide according to the invention, reference numbers exceed by four hundred the reference numbers of corresponding parts in FIG. 3.

In this embodiment, the synthetic resin shoe 510 is formed so its central part has a slope on both sides of a longitudinal center line whereby the central part of the sliding contact surface 510a is inward from the outer parts thereof, i.e., the central part is closer to the support side of the guide. The sloping parts can be either straight in cross-section, as illustrated in FIG. 14, or curved. The sloping parts of the sliding contact surface 510a extend to locations opposite parts of the link plates of a chain sliding on the shoe so that those parts of the link plates do not come into sliding contact with the shoe. As shown in FIG. 14, parts of the inner link plates of the chain are not in contact with the shoe. As a result, frictional losses are reduced and wear and damage to the sliding-contact surface 501a are suppressed. The movable guide 500 of the fifth embodiment also exhibits the effects and advantages of the guide 100 of the first embodiment.

Figure 15:
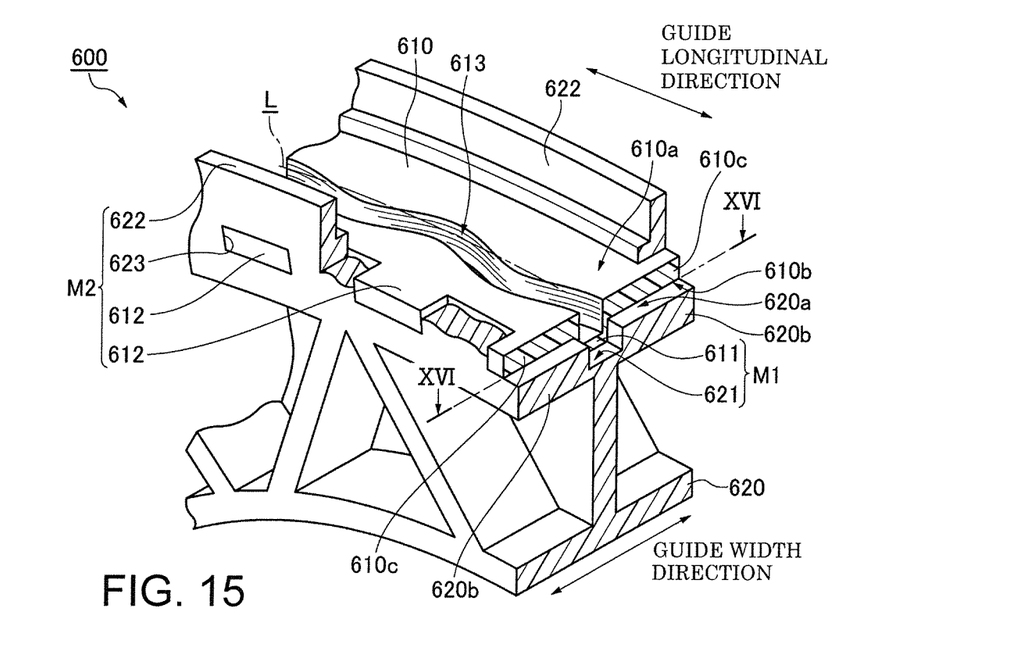
FIG. 15 is a fragmentary perspective view of a transmission guide according to a sixth embodiment of the invention.
Figure 16:
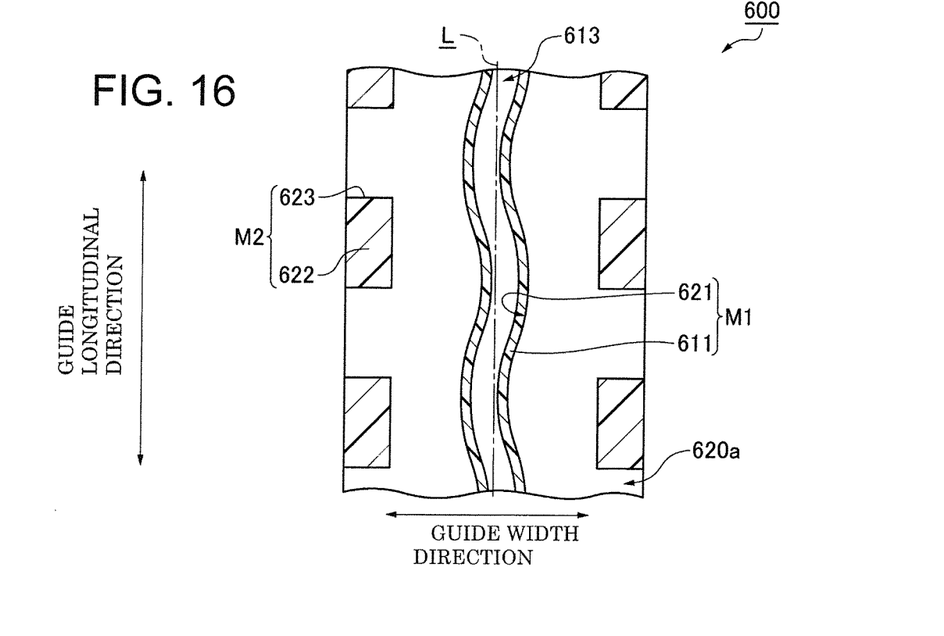
FIG. 16 is a sectional view of the transmission guide taken through the synthetic resin shoe and seen in the direction of arrows XVI-XVI in FIG. 15.

In FIGS. 15 and 16, which show a sixth embodiment of the guide according to the invention, reference numbers exceed by five hundred the reference numbers of corresponding parts in FIG. 3.

In this embodiment, a convex protrusion 611 formed as a projecting strip that extends longitudinally on the back side of a synthetic resin shoe 610. This strip is disposed within a similarly shaped elongated concave groove 621 formed in the front of synthetic resin base 620.

The configuration in the embodiment shown in FIGS. 15 and 16, in which convex protrusion 611 is disposed in concave groove 610, increases the area of the fused bond between the shoe 610 and the base 620.

The protrusion 611 and the groove 621 have a repeating wave-like shape that resists a longitudinal shearing force is applied to the shoe. The wave-like shape is characterized by an alternating widthwise deviation of the position of the groove from one side to the other of a longitudinal center line L, as shown in FIG. 16.

The large area of the recess 613 in the shoe also enhances radiant dissipation of heat generated by the sliding travel of the transmission chain on the shoe, and can prevent softening and deformation of the shoe.

The movable guide 600 of the sixth embodiment also exhibits the effects and advantages of the guide 100 of the first embodiment.

Figure 17:
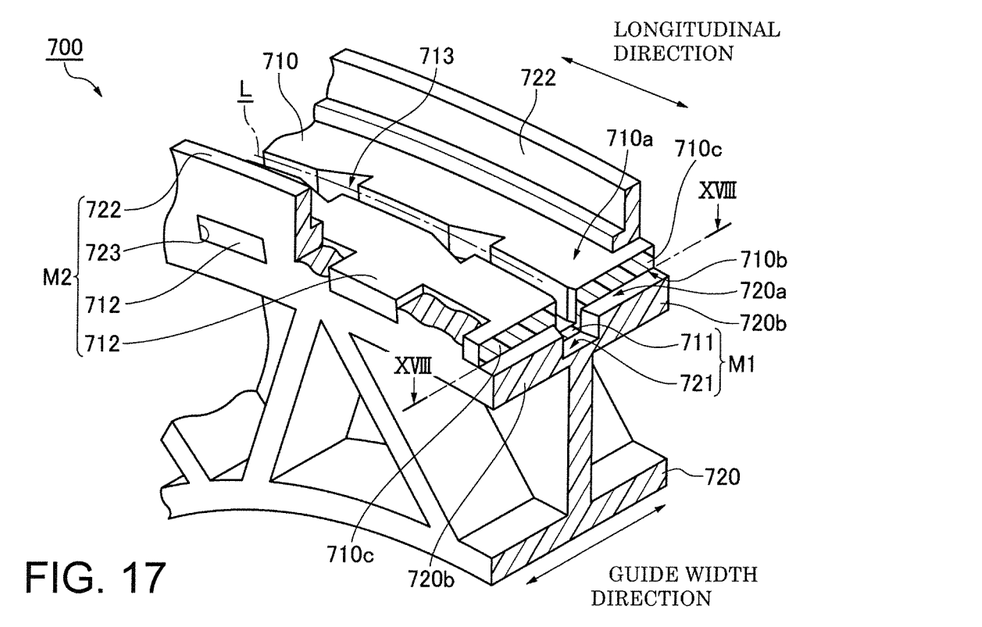
FIG. 17 is a fragmentary perspective view of a transmission guide according to a seventh embodiment of the invention.
Figure 18:
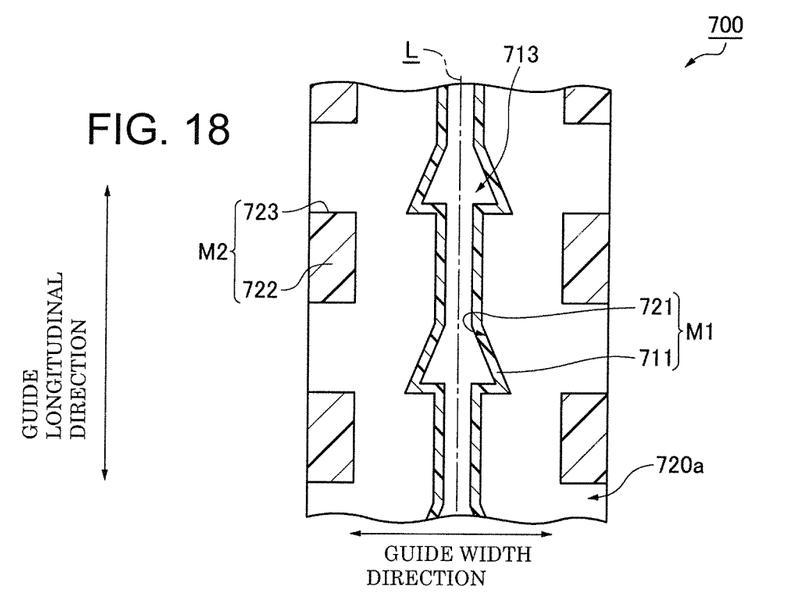
FIG. 18 is a sectional view of the transmission guide taken through the synthetic resin shoe and seen in the direction of arrows XVIII-XVIII in FIG. 17.

In FIGS. 17 and 18, which show a seventh embodiment of the guide according to the invention, reference numbers exceed by six hundred the reference numbers of corresponding parts in FIG. 3.

In this embodiment, a convex protrusion 711 on a synthetic resin shoe 710 is dispose in a groove 721 formed in a synthetic resin base 720. Both the protrusion 711 and the groove 721 are configured with repeating arrowhead-shaped parts each of which has a gradually decreasing width proceeding in the direction of travel of a transmission chain on the guide.

With this embodiment, the configuration of the protrusion 711 and the groove 721 resists a longitudinal shearing force applied to the shoe. Moreover, as in the sixth embodiment, the large area of the recess 713 in the shoe also enhances radiant dissipation of heat generated by the sliding travel of the transmission chain on the shoe, and can prevent softening and deformation of the shoe.

The transmission guides of the several embodiments, produced by two-member molding, can be produced efficiently because an assembly step in which a separately formed shoe is attached to a base is unnecessary. The rigidity of the base can be greater than that of the shoe, and the strength of the fused bond between the shoe and the base is enhanced by the cooperating protrusions and recesses or grooves, and the guide absorbs differences in the thermal expansion and contraction of the shoe and the base.

The features of the invention can also be incorporated into a stationary chain guide. Moreover, the guide can be used with a silent chain as well as with a roller chain or rollerless bushing chain.

Various molding processes can be utilized to join the shoe to the base, including ordinary two-member molding, two-color molding, and sandwich molding. The molding process can be implemented by carrying out primary injection molding using a primary cavity and core to mold the base, taking out the base from the primary cavity, and mounting the base in a secondary cavity, and carrying out secondary injection molding to mold the shoe an joint the shoe to the base.

Alternatively, the shoe can be molded in a primary cavity, taken out of the primary cavity and mounted in a secondary cavity in which the base is molded and joined with the shoe in a secondary injection molding step.

The material of the synthetic resin used for the transmission guide of the invention can be a synthetic resin such as polyamide and polybutylene terephthalate. The material of the shoe is preferably a polyamide resin such as polyamide 6, polyamide 66, polyamide 46, or other aromatic and non-aromatic resins that exhibit self-lubricating properties. The base that supports the back surface of the shoe is preferably a reinforced polyamide resin, containing glass fibers, for enhanced strength and wear resistance.

The protrusions and recesses are disposed at predetermined intervals along the length of the guide preferably at least three locations including a location adjacent the chain entry end, a location adjacent the chain exit end, and an intermediate location between the chain entry and chain exit ends.

What is claimed is:

1. A transmission guide comprising:
    an elongated synthetic resin shoe having a sliding contact surface on which link plates of a transmission chain can travel in a longitudinal direction and a back surface; and
    an elongated synthetic resin base having a supporting surface for supporting said shoe by engagement with said back surface of shoe, the rigidity of the base being greater than the rigidity of the shoe;
    wherein the shoe is integrally molded with the base by two-member molding whereby the shoe and base are fused together;
    wherein the guide includes a guide length retaining mechanism, formed on the back surface of the shoe and the supporting surface of the base, for retaining the shoe against longitudinal movement relative to the base;
    wherein the guide length retaining mechanism is composed of at least one convex protrusion protruding from the back surface of the shoe and at least one concave recess formed the supporting surface of the base, each said protrusion being disposed in one said concave recess;
    wherein the guide also includes a guide width retaining mechanism, formed on side edges of the shoe and side portions of the base, for retaining the shoe against widthwise movement relative to the base;
    wherein the synthetic resin shoe has opposite side edges, and is formed with a plurality of concave recesses in its sliding contact surface, said recesses being disposed along a longitudinal center line between said side edges; and
    wherein at least one of said concave recesses in the sliding contact surface of the shoe is located directly opposite said at least one convex protrusion protruding from the back surface of the shoe.

2. The transmission guide according to claim 1, wherein the guide has a chain entry end and a chain exit end, and wherein each convex protrusion on the shoe and each concave recess of the base has a gradually reducing width proceeding in a direction from the chain entry end toward the chain exit end.

3. The transmission guide according to claim 1, wherein the shoe has opposite side edges, wherein the guide width retaining mechanism is composed of a pair of opposed side walls that extend from the supporting surface of the base on said opposite side edges of the shoe, and wherein said side walls sandwich the shoe from both sides in the guide width direction, said shoe is formed with projections extending from its side edges, and said side walls are formed with holes receiving said projections, and wherein each of said concave recesses in the sliding contact surface of the shoe is juxtaposed with a pair of said projections extending from the side edges of the shoe.

4. The transmission guide according to claim 1, wherein said convex protrusion of the shoe is in the form of a strip extending longitudinally along the shoe, and wherein said concave recess of the base is in the form of a groove extending longitudinally along the base.

5. The transmission guide according to claim 4, wherein the convex protrusion of the shoe and the concave recess of the base have a wave-like shape characterized by an alternating widthwise deviation from one side to the other of a longitudinal center line extending along the length of the guide.

6. The transmission guide according to claim 1, wherein the guide has a chain entry end and a chain exit end, and wherein each convex protrusion of the shoe and each concave recess of the base has a width that gradually decreases, proceeding from the chain entry end of the guide toward the chain exit end.

7. The transmission guide according to claim 4, wherein the shoe has opposite side edges, and wherein the shoe has a concave recess formed in its sliding contact surface, said recess being in the form of an elongated longitudinal groove extending along a center line between said opposite side edges.

8. The transmission guide according to claim 1, wherein each of said concave recesses in the sliding contact surface of the shoe has a wedge-shaped cross-section tapering in the direction of the width of the guide, proceeding into the shoe from the sliding contact surface thereof in a direction orthogonal to said sliding-contact surface.

9. The transmission guide according to claim 1, wherein the sliding-contact surface of the shoe is formed with a central part having a slope on both sides of a longitudinal center line, the slope on said both sides being such that the central part of the sliding contact surface is closer than the outer parts of said sliding contact surface to the back surface of the shoe.

10. The transmission guide according to claim 1, wherein said at least one of said concave recesses in the sliding contact surface of the shoe extends past said back surface of the shoe and into the interior of one said convex protrusions protruding from the back surface of the shoe.

11. A transmission guide comprising:
an elongated synthetic resin shoe having a sliding contact surface on which link plates of a transmission chain can travel in a longitudinal direction and a back surface; and
an elongated synthetic resin base having a supporting surface for supporting said shoe by engagement with said back surface of shoe, the rigidity of the base being greater than the rigidity of the shoe;
wherein the shoe is integrally molded with the base by two-member molding whereby the shoe and base are fused together;
wherein the guide includes a guide length retaining mechanism, formed on the back surface of the shoe and the supporting surface of the base, for retaining the shoe against longitudinal movement relative to the base;
wherein the guide length retaining mechanism is composed of plural convex protrusions protruding from the back surface of the shoe and plural concave recesses formed the supporting surface of the base, each said protrusion being disposed in one said concave recess, and the protrusions and recesses being disposed at intervals along the length of the guide;
wherein the guide also includes a guide width retaining mechanism, formed on side edges of the shoe and side portions of the base, for retaining the shoe against widthwise movement relative to the base;
wherein the synthetic resin shoe has opposite side edges, and is formed with a plurality of concave recesses in its sliding contact surface, said recesses being disposed along a longitudinal center line between said side edges; and
wherein each of said concave recesses in the sliding contact surface of the shoe is located directly opposite one of said convex protrusions protruding from the back surface of the shoe.

12. The transmission guide according to claim 11, wherein the shoe has opposite side edges, wherein the guide width retaining mechanism is composed of a pair of opposed side walls that extend from the supporting surface of the base on said opposite side edges of the shoe, and wherein said side walls sandwich the shoe from both sides in the guide width direction, said shoe is formed with projections extending from its side edges, and said side walls are formed with holes receiving said projections, and wherein each of said concave recesses in the sliding contact surface of the shoe is juxtaposed with a pair of said projections extending from the side edges of the shoe.

13. The transmission guide according to claim 11, wherein said each of said concave recesses in the sliding contact surface of the shoe extends past said back surface of the shoe and into the interior of one of said convex protrusions protruding from the back surface of the shoe.

14. The transmission guide according to claim 11, wherein the guide has a chain entry end and a chain exit end, and wherein each convex protrusion of the shoe and each concave recess of the base has a width that gradually decreases, proceeding from the chain entry end of the guide toward the chain exit end.

15. The transmission guide according to claim 11, wherein each of said concave recesses in the sliding contact surface of the shoe has a wedge-shaped cross-section tapering in the direction of the width of the guide, proceeding into the shoe from the sliding contact surface thereof in a direction orthogonal to said sliding-contact surface.

16. The transmission guide according to claim 11, wherein the sliding-contact surface of the shoe is formed with a central part having a slope on both sides of a longitudinal center line, the slope on said both sides being such that the central part of the sliding contact surface is closer than the outer parts of said sliding contact surface to the back surface of the shoe.

* * * * *